73-649 SR

XR 2,776,410

SEARCH ROOM

SUBSTITUTE FOR MISSING XR

CROSS REFERENCE

Jan. 1, 1957 G. GUANELLA 2,776,410

MEANS FOR AND METHOD OF COMPENSATING SIGNAL DISTORTION

Filed March 26, 1953 6 Sheets-Sheet 1

INVENTOR
GUSTAV GUANELLA
BY [signature]
ATTORNEY

MEANS FOR AND METHOD OF COMPENSATING SIGNAL DISTORTION

INVENTOR
GUSTAV GUANELLA
BY [signature]
ATTORNEY

MEANS FOR AND METHOD OF COMPENSATING SIGNAL DISTORTION

Filed March 26, 1953 6 Sheets-Sheet 3

INVENTOR
GUSTAV GUANELLA
BY [signature]
ATTORNEY

MEANS FOR AND METHOD OF COMPENSATING SIGNAL DISTORTION

Filed March 26, 1953 6 Sheets-Sheet 4

INVENTOR
GUSTAV GUANELLA
BY [signature]
ATTORNEY

MEANS FOR AND METHOD OF COMPENSATING SIGNAL DISTORTION

Filed March 26, 1953 6 Sheets-Sheet 5

INVENTOR
GUSTAV GUANELLA
BY [signature]
ATTORNEY

Jan. 1, 1957 G. GUANELLA 2,776,410

MEANS FOR AND METHOD OF COMPENSATING SIGNAL DISTORTION

Filed March 26, 1953 6 Sheets-Sheet 6

INVENTOR
GUSTAV GUANELLA
BY Karl Rau
ATTORNEY

United States Patent Office 2,776,410

Patented Jan. 1, 1957

2,776,410

MEANS FOR AND METHOD OF COMPENSATING SIGNAL DISTORTION

Gustav Guanella, Zurich, Switzerland, assignor to Radio Patents Company, New York, N. Y., a partnership Application March 26, 1953, Serial No. 344,813

13 Claims. (Cl. 333—28)

The present invention relates to means for and a method of reducing or eliminating signal distortion in electrical communicating systems due to the non-linear input-output relation of a signal wave path or circuit between a transmitter and a receiver or to the characteristic of the translating and control devices forming part of the circuit.

As is well known in electrical communication engineering, both the circuits used and translating devices, such as amplifiers, modulators, detectors, filters, transformers, etc. are apt to produce non-linear distortion liable to deleteriously affect the quality or fidelity of the signals being transmitted. In order to reduce this distortion, it is customary to use inverse feedback circuits which, however, do not afford a complete remedy and the practical realization of which frequently involves substantial difficulties. It has furthermore been proposed to compensate or neutralize the distortion by an auxiliary network having a transmission characteristic complementary to the characteristic of the transmitting circuit or devices producing the distortion, in such a manner as to obtain a substantially linear or distortion-free relation between the output and input magnitudes of the total transmission path or system. The realization of this method is, however, also frequently accompanied by difficulties since it is impractical or impossible in most cases to produce by simple means a characteristic complementary to the normally existing transmission characteristics such as those of amplifier tubes, transformers and other translating devices.

An object of the present invention is, therefore, the provision of an improved method of and system for compensating non-linear distortion in signaling systems which substantially overcomes the disadvantages and drawbacks inherent in the previously known compensating methods and circuits; which eliminates the use of networks or devices having characteristics complementary to the characteristic causing the distortion and being difficult to realize in practice; which utilizes a compensating network or device having a distortion characteristic equal or similar to the characteristic of the distorting devices or circuits; which is both simple in design and easy to adjust and operate; which may be designed for reducing or eliminating both amplitude and phase distortion; and which may be embodied in or adapted to existing transmission systems without requiring substantial changes or modifications of the design or operation thereof.

The invention, both as to its further objects and novel aspects, will be better understood by reference to the following detailed description of a few practical embodiments considered in conjunction with the accompanying drawings, forming part of this specification and wherein.

Like reference characters identify like parts and magnitudes throughout the different views of the drawings.

With the aforementioned objects in view, the invention involves generally the provision of a distortion compensating network or device having an input-output transmission characteristic as regards the magnitude to be compensated (amplitude, phase) equal to or similar to the characteristic of the distorting device or circuit and to which is applied an incoming distorted signal. At the same time, the incoming signal is applied to a distortion-free network or device and the output signals of the compensating network and of the distortion-free network are combined in relative opposite polarity as regards the magnitude to be compensated by means of a suitable combining network or device, to produce a resultant substantially distortion-free differential output signal, provided a proper design and adjustment of the parameters of the devices or network, as described in greater detail hereinafter.

Figure 1:
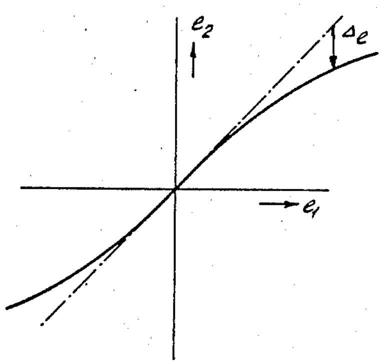
Figures 1 and 2 show a pair of complementary input-output transmission characteristics explanatory of the function of previously known distortion compensating methods.
Figure 2:
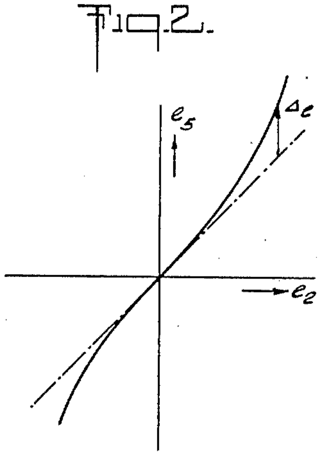

Referring more particularly to Fig. 1 of the drawings, there is shown a common non-linear transmission characteristic of an amplifier or the like representing an output magnitude such as voltage $e_2$ as a function of an input magnitude or voltage $e_1$. As a result of the non-linear relation between the input and output magnitudes, an error or distortion voltage $\Delta e$ occurs in the output of the device being equal to the difference between the non-linear characteristic and a linear characteristic, as shown by the dot-dash lines and varying for different input magnitudes or voltages $e_1$. In order to eliminate or compensate the distortion $\Delta e$ in accordance with known methods, the distorted signal is applied to a compensating network having a complementary transmission characteristic with respect to the linear (not-dash) relation, as shown in Fig. 2, in such a manner as to result in a final output voltage $e_5$, being proportional to the input voltage $e_1$ over a desired operating range. The practical realization of such a complementary characteristic as shown by Fig. 2 is frequently difficult and in most cases requires a considerable amount of apparatus or circuit elements as well as a close adjustment of the circuit parameters. By the present invention the difficulties inherent in the previous compensating methods are substantially overcome.

Figure 3:
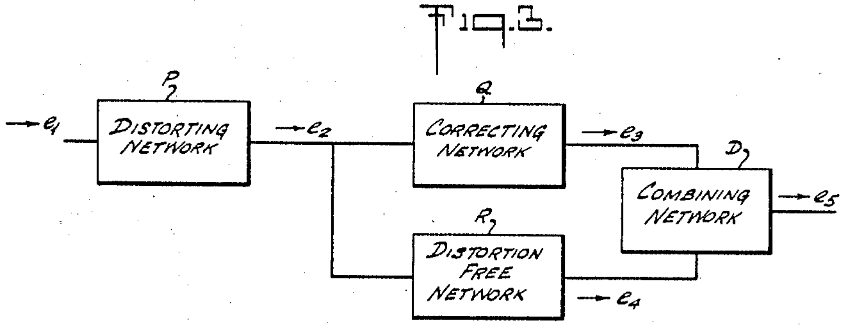
Fig. 3 is a block diagram showing the basic layout of a system for compensating amplitude distortion embodying the principles of the present invention.

Fig. 3 is a basic block diagram of a circuit for compensating amplitude distortion in accordance with the principles of the invention. The distorting circuit or network P may have a non-linear characteristic or relation between the input magnitude (voltage) $e_1$ and the output magnitude (voltage) $e_2$ of the type as shown by Fig. 1. P may be either a simple device, such as an amplifier, transformer, filter, etc. or a complete transmission network or signal path as shown in greater detail in Fig. 14, to be described hereinafter.

The compensating or distortion correcting network Q being connected to the output of the network P has a transmission characteristic with regard to the distorting magnitude to be compensated (amplitude, phase) being substantially equal or related by a constant factor to the characteristic of the distorting network P, that is, as shown by Fig. 1 in the example mentioned. As a result, an output magnitude $e_3$ is produced by the network Q whose distortion is still greater than the distortion of the magnitude $e_2$.

At the same time, the magnitude $e_2$ is applied to an at least approximately distortion-free or linear network or device R which may be a simple potential divider, a linear amplifier, or the like, whereby to result in an output magnitude $e_4$ proportional to the distorted magnitude $e_2$. The magnitudes $e_3$ and $e_4$ are then applied to a suitable combining device or network D to produce a final substantially distortion-free magnitude or signal $e_5$ proportional to the difference between the signals $e_4$ and $e_3$ with regard to the distorting magnitude (amplitude) to be compensated.

Disregarding any constant amplification or attenuation factors which are immaterial for a consideration of the function of the invention, the transmission factors of the various parts or circuits to effect a final compensation of the distortion according to the invention are given by the following equations:

(1) $e_2/e_1=1+\delta_1$ for network P (2) $e_3/e_2=1+\delta_2$ for network Q (3) $e_4/e_2=1+\frac{1}{n}$ for network R wherein $\delta_1$ and $\delta_2$ are the distortions or deviations from a linear input-output relation for the networks P and Q, disappearing for small amplitudes, and wherein $n=\delta_1/\delta_2$. In other words, the distortion produced by the compensating network Q may be less by a constant factor ($n$) than the distortion produced by the network P. In the latter case, the transmission factor or gain of the distortion-free system R is adjusted to correspond to the ratio between the distortions $\delta_1$ and $\delta_2$. From the above equations there is derived the final output voltage $e_5$ as follows:

(4) $e_5=e_1(1-\delta_1^2)\cdot\frac{1}{n}\approx e_1\cdot\frac{1}{n}$

It is seen, therefore, that the output magnitude $e_5$ is proportional to the input magnitude $e_1$ and is substantially free from distortion, provided the square of the distortion $\delta_1$ is small or negligible compared with 1.

Figure 5A:
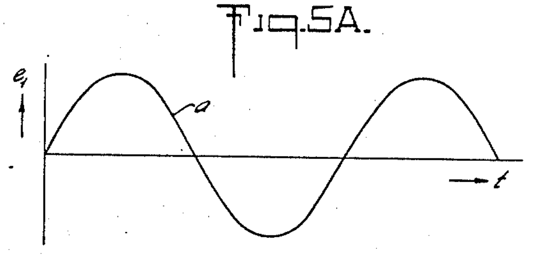
Figures 5A to 5F are theoretical curves explanatory of the function of compensating amplitude distortion according to the invention.
Figure 5C:
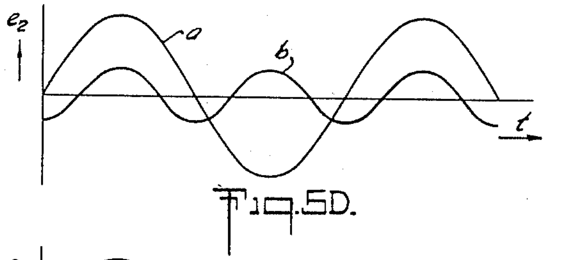
Figure 5D:
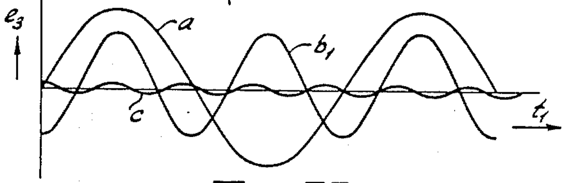
Figure 5B:
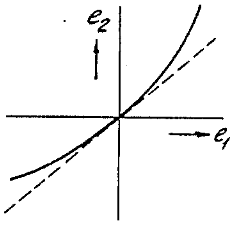

The function of the invention in eliminating amplitude distortion will be further understood by reference to Figures 5A to 5F. In Figure 5A the input voltage $e_1$ is assumed to be a pure sine wave $a$ and the system or network is assumed to have a transmission characteristic as shown in Fig. 5B so as to result in non-linear or quadratic distortion in a manner well known. Accordingly, the output voltage $e_2$, Fig. 5C, in addition to the fundamental wave $a$, will include a second harmonic wave shown somewhat exaggerated in the drawing and whose amplitudes coincide with the amplitudes of the fundamental, as shown in the drawing. The additional distortion of the voltage $e_2$ by the compensating network Q, assumed to have the same transmission characteristic, Fig. 5*B*, as the distorting network P ($n=1$) results in an output voltage $e_3$, Fig. 5D, comprising a second harmonic $b_1$ of twice the amplitude of the harmonic $b$ of the signal $e_2$ and a fourth harmonic $c$ having amplitudes also coinciding with the amplitudes of the harmonic $b_1$ and being of relatively low value compared with the fundamental $a$ and second harmonic $b_1$.

Figure 5E:
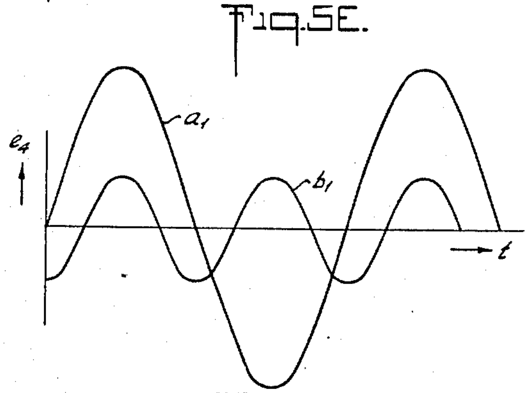
Figure 5F:
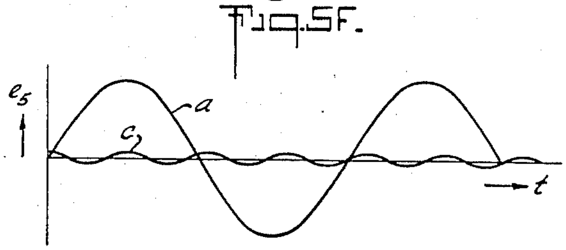

On the other hand, the voltage $e_4$ at the output of the distortion-free network R will be equal to or twice the amplitude of the voltage $e_2$ as a result of the gain or amplification factor $$\left(1+\frac{1}{n}\right)$$

of the network R as given by the Equation 3, i. e. comprising a fundamental $a_1$ of twice the amplitude of the fundamental $a$ and a second harmonic $b_1$ of twice the amplitude of the second harmonic $b$, as shown in Fig. 5E. As a result, the difference between the voltages $e_4$ and $e_3$ in the combining circuit D yields a final output voltage $e_5$, as shown by Fig. 5, wherein the harmonic $b$ has been cancelled and negligible amplitude due to the double or successive quadratic distortion by the networks P and Q, respectively. In other words, the aforedescribed distortion compensating system comprising the correcting network Q, the distortion-free network R and the combining network D, results in a non-linear relation between the voltages $e_2/e_5$ or corresponding to the characteristic according to Fig. 2 in the example mentioned, thus causing a cancellation of the distortion produced in the network or device P.

The distorting circuit or system may consist of a plurality ($n$) of individual networks or devices each producing a distortion $\delta_0$. In this case, in order to compensate the total distortion, a compensating network Q is required whose distortion is equal to that of only a single network or device of the system P. In the latter case the equations for the various devices or networks are as follows:

(5) $e_2/e_1=(1+\delta_0)^n\approx 1+n\cdot\delta_0$ (6) $e_3/e_2=1+\delta_0$ (7) $e_4/e_2=1+1/n$ (8) $e_5=e_1(1-n^2.\delta_0^2)\cdot\frac{1}{n}\approx e_1\cdot\frac{1}{n}$ In the practical realization of the invention, the transit time or time constant of the correcting network Q may cause a phase shift of the ouput magnitude $e_3$ relative to the input magnitude $e_2$, whereby the instantaneous deviations between the input and output magnitudes may be appreciable even in case of relatively slight non-linear distortion. In this case, the distortion is no longer compensated since the distortion or rather the square of the distortion $\delta_2$ caused by the phase shift will be no longer negligible. In such cases it is necessary to provide an additional delay line or device in the distortion-free system R having a transit time $\tau_2$ corresponding to the mean transit time of the correcting network Q. It is not necessary, however, that the transit time $\tau_2$ corresponds with the transit time $\tau_0$ of the distorting network P.

Figure 4:
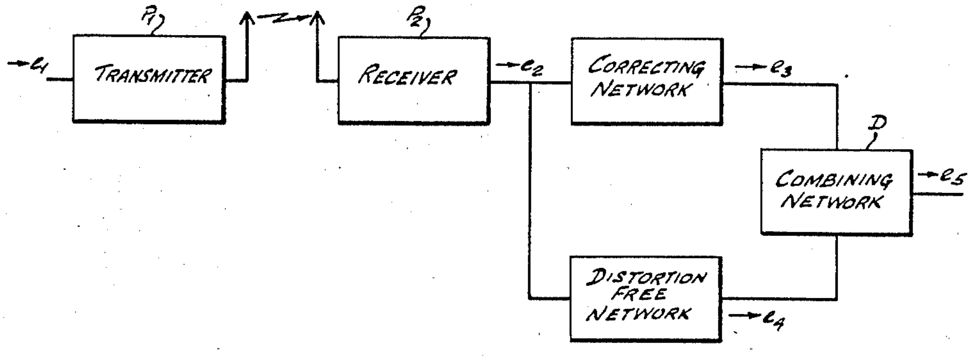
Fig. 4 is a block diagram illustrating a radio signaling system embodying a distortion compensating system according to Fig. 3.

Fig. 4 shows an example of a signaling system embodying a distortion compensating arrangement according to the invention. In this case $P_1$ represents a radio transmitter to which is applied an input (audio, video) signal voltage $e_1$ and $P_2$ is a receiving system producing an output voltage or signal $e_2$ which is distorted by the characteristics of the total transmission path comprising transmitter $P_1$ and receiver $P_2$. The signal may be transmitted by means of amplitude modulation of a high frequency carrier wave, whereby the total distortion is determined by the characteristics of the various transmitting and receiving devices, such as amplifiers, modulators, demodulators, filters, etc. The correcting network Q is designed to have a transmission characteristic being equal or related by a constant factor to the transmission characteristic of the entire signal path comprising the transmitter and receiver, as is readily understood from the foregoing.

The arrangement according to the invention may also serve for compensating distortion of frequency or phase modulated signals, in which case it is desirable to eliminate undesirable phase deviations caused by one or more devices or circuits having a non-linear input-output phase characteristic and being inserted in the signal transmission path. In this case, the correcting network Q is designed to simulate or substitute the undesirable phase shift caused by the distorting system P, while the device or network D serves to produce an output magnitude having a phase determined by the difference of the phases of the applied input voltages $e_3$ and $e_4$. In other words, the device D is so designed as to produce a difference of the instantaneous frequencies or phase angles of the voltages $e_3$ and $e_4$, rather than a difference of the amplitudes of these voltages, as in the case of amplitude distortion described hereinbefore. For this purpose, the device D may be in the form of a modulator adapted to produce a difference phase or frequency, in a manner well known by those skilled in the art.

Figure 6:
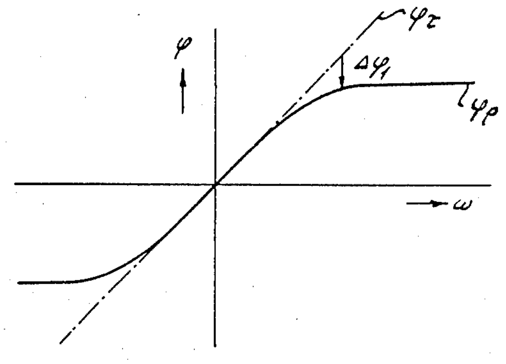
Fig. 6 shows a common non-linear phase characteristic of a circuit or network to be compensated by the invention.

A frequency or phase modulated high frequency signal may be expressed by the following equation:

$$e=E\sin(\omega t+\varphi(t)) \tag{9}$$

wherein the instantaneous modulation is represented by the magnitude $\varphi(t)$. In this case, the parameters (transit time and phase angle changes) for the distorting network P, the correcting network Q and the distortion-free network R are as follows:

For P: $\tau_1$ and $\Delta\varphi_1$
For Q: $\tau_2$ and $\Delta\varphi_2$
For R: $\tau_2$ and $\Delta\varphi=0$ wherein $\tau_1$ and $\tau_2$ are the transit times of the networks P and Q, resulting in phase shifts or deviations from a linear phase relation $\Delta\varphi_1$ and $\Delta\varphi_2$ respectively. The total phase shift $\Delta_P$ of the transmission system P as a function of the frequency $\omega$ is shown in Fig. 6. In the latter, $\varphi\tau$ represents the frequency proportional phase shift corresponding to the transit time $\tau$. The latter causes merely a constant delay of the signal and does not result in any distortion, the latter being due to the residual phase shift $\Delta\varphi_1$ to be compensated. For this purpose, the compensating network is designed to effect an additional phase shift $\Delta\varphi_2$.

Figure 7:
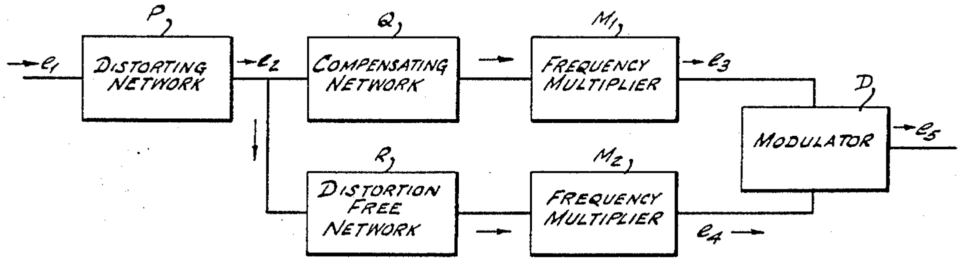
Fig. 7 is a block diagram of a basic system according to the invention for compensating phase distortion.

A basic arrangement for compensating phase distortion of this type is shown in Fig. 7. In the latter, the distorting system P may contain one or a plurality of band pass filters each having a transit time $\tau_0$ being a portion of the total transit time $\tau_1$ as shown in greater detail in Fig. 15 to be described hereafter. The compensating network Q contains at least one band pass filter of the same time constant, i. e. having a transmission time $\tau_2=\tau_0$. Furthermore, a delay or substitute line having the same transit time is embodied in the distortion-free network R. The output frequencies of the networks Q and R are multiplied by means of a pair of frequency multipliers $M_1$ and $M_2$, having multiplication factors $m$ and $m+1$, respectively, to produce an output voltage $e_3$ having a frequency $m\omega$ and an output voltage $e_2$ having a frequency $(m+1)\omega$, respectively, wherein $\omega$ represents the angular velocity or frequency of the signal $e_2$. In the arrangement D, which may be in the form of a known modulator, the signals $e_3$ and $e_4$ are combined to produce a final output signal $e_5$ having a frequency $\omega$ equal to the difference of the frequencies of the signals $e_4$ and $e_3$. If the multiplication factor $m$ corresponds to the ratio of the phase shifts caused by the networks P and Q, the various frequencies and phase angles are then given as follows:

$$\omega_3=m.\omega_2 \text{ and } \varphi_3=m.(\varphi_2+\Delta\varphi_2) \tag{10}$$

$$\omega_4=(m+1).\omega_2 \text{ and } \varphi_4=(m+1).\varphi_2 \tag{11}$$

$$\omega_5=\omega_4-\omega_3=\omega_2 \text{ and } \varphi_5(t)=\varphi_4(t)-\varphi_3(t)=\varphi_1(t-\tau) \tag{12}$$

As an example, if the system P includes $m$ identical band pass filters producing a total delay $\tau_1$, a single filter of this type may serve as a compensating network Q. In this case, the phase angle of the output voltages $e_5$ will be equal to the phase angle of the input voltage $e_1$ except for a constant frequency-proportional delay. Since this phase angle is characteristic of the frequency or phase modulation according to the signal being transmitted, disturbing distortion in the signal $e_5$ is eliminated.

Figures 8A, 8B, 8C, 8D, 8E:
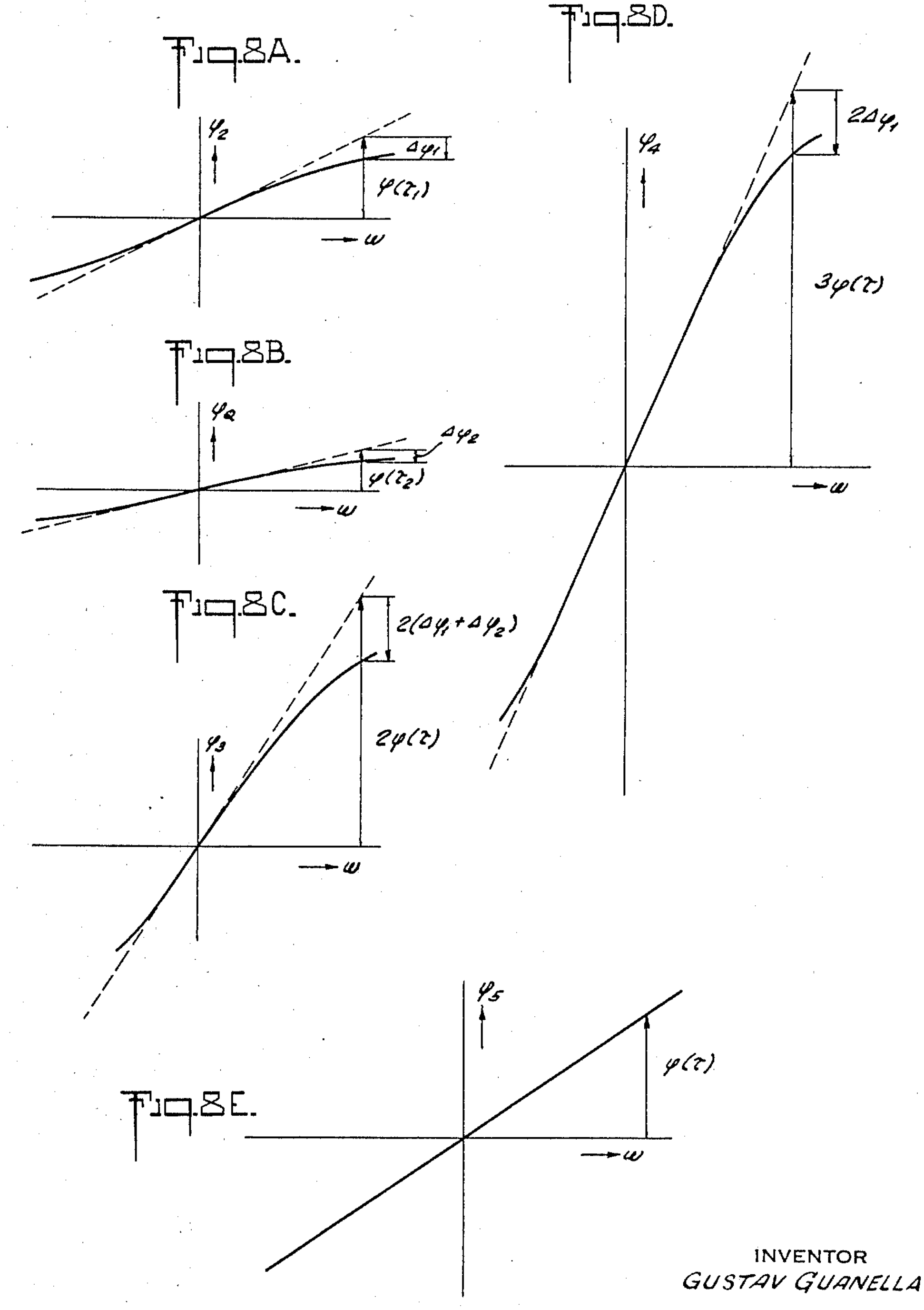
Figures 8A to 8E are a number of graphs explanatory of the function of compensating phase distortion according to the invention.

The function of the invention in eliminating phase or frequency distortion will be further understood by reference to Figures 8A and 8D. The phase angle $\varphi_2$ of the received or distorted voltage is given as follows:

$$\varphi_2=\varphi(\tau_1)+\Delta\varphi_1 \tag{13}$$

wherein $\varphi(\tau_1)$ represents the frequency proportional phase shift of the network P corresponding to a constant transit time $\tau_1$ and $\Delta\varphi_1$ represents the distortion or additional phase shift being independent of frequency and to be eliminated or neutralized. Network Q products an additional phase shift $\varphi_Q$, whereby the phase at the output of this network or at the input of the multiplier $M_1$ will be as follows:

$$\varphi_{30}=\varphi_2+\varphi_Q=\varphi_2+\varphi(\tau_2)+\Delta\varphi_2=\varphi(\tau_1)+\varphi(\tau_2)+\Delta\varphi_1+\Delta\varphi_2 \tag{14}$$

wherein $\varphi(\tau_2)$ represents the frequency proportional phase shift of this network corresponding to a transit time $\tau_2$ and $\Delta\varphi_2$ represents the additional phase distortion.

The sum of the transit times $\tau_1$ of P and $\tau_2$ of Q represents the total transit time:

$$\tau=\tau_1+\tau_2 \tag{15}$$

Analogously, the total phase shift is as follows:

$$\varphi(\tau)=\varphi(\tau_1)+\varphi(\tau_2) \tag{16}$$

By multiplication of the frequency in $M_1$ by a factor $m$, the phase angle will be multiplied accordingly, i. e.

$$\varphi_3=m.\varphi_{30}=m[\varphi(\tau)+\Delta\varphi_1+\Delta\varphi_2] \tag{17}$$

The auxiliary network R is designed to be free from additional phase distortion, i. e. the phase angle $\varphi_{40}$ of output voltage $e_4$ of this network is displaced in respect to the input voltage merely by the additional frequency proportional phase shift $\varphi(\tau_2)$, since the transit time of Q and R has been assumed to be the same. $\varphi_{40}$ is accordingly expressed as follows:

$$\varphi_{40}=\varphi_2+\varphi_R=\varphi_2+\varphi(\tau_1)=\varphi(\tau_1)+\varphi(\tau_2)+\Delta\varphi_1 \tag{18}$$

By a multiplication of the frequency in $M_2$ by a factor $m+1$ there is then produced a voltage $e_4$ having a multiplied phase angle $\varphi_4$ as follows:

$$\varphi_4=(m+1).\varphi_{40}=(m+1.[\varphi(\tau)+\Delta\varphi_1] \tag{19}$$

The signals $e_3$ and $e_4$ are combined in D to form a modulation product containing components of both sum and difference frequency. The sum frequencies are suppressed, leaving a voltage having a frequency equal to the difference of the frequencies of the voltages $e_4$ and $e_3$. As a result the phase angle $\varphi_5$ of the output voltage $e_5$ is determined by the difference of the phase angles of the voltages $e_4$ and $e_3$ as follows:

$$\varphi_5=\varphi_4-\varphi_3=\varphi(\tau)+\Delta\varphi_1-m\Delta\varphi_2 \tag{20}$$

As in the case of amplitude distortion, the correcting or auxiliary network Q is so designed in respect to the distorting network P that their phase distortions are proportional to each other. In other words, the phase distortion $\Delta\varphi_2$ is only a fraction of the distortion $\Delta\varphi_1$ and assuming $$\frac{\Delta\varphi_1}{\Delta\varphi_2}=m$$

then the phase angle $\varphi_5$ of the output voltage will be as follows:

$$\varphi_5=\varphi(\tau) \tag{21}$$

This phase angle corresponds, therefore, to the total phase shift proportional to the transit time $\tau$ and the output voltage $e_5$ is displaced relative to the input voltage $e_1$ merely by the transit time $\tau$ or free from any additional phase distortion. Figures 8A to 8E illustrate these conditions for a coefficient $m=2$. Figure 8A shows the phase distortion caused by the network P, wherein $\varphi(\tau_1)$ corresponds to the transit time $\tau$ while $\Delta\varphi_1$ represents the phase distortion. Similarly, Fig. 8B shows the additional distortion by the compensating network Q being one-half of the distortion of the network P according to a factor $m=2$ as assumed above. Finally, Fig. 8C shows the phase angle $\varphi_3$ at the output of the multiplier $M_1$ obtained by addition and doubling ($m=2$) of the phase shifts produced by the networks P and Q.

Similarly, Fig. 8D shows the phase angle at the output of the multiplier $M_2$ obtained by addition and trebling ($m+2$) of the phase shifts caused by the networks P and R. The difference between the thus obtained phase angles $\varphi_4$ and $\varphi_3$ results in a final phase shift as shown by Fig. 8E, being proportional to the transit time $\tau$ and being free from phase distortion, in a manner readily understood.

Figure 9:
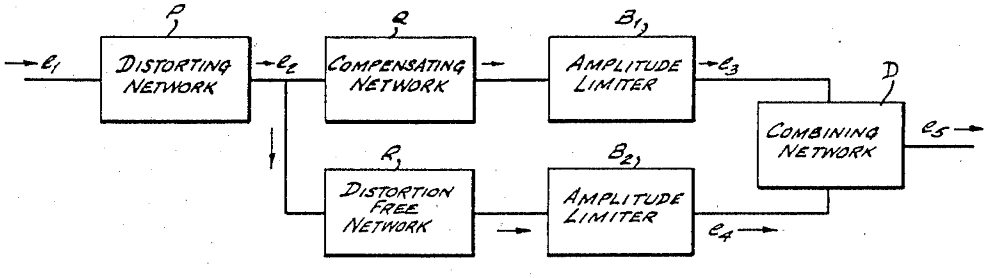
Figures 9 to 13 are further block diagrams illustrating modifications for effecting amplitude and phase distortion compensation in accordance with the invention.

Fig. 9 shows a modified arrangement for compensating phase distortion, wherein frequency multiplication is dispensed with. This system differs from the arrangement according to Fig. 7 by the provision of a pair of amplitude limiters $B_1$ and $B_2$ replacing the frequency multipliers $M_1$ and $M_2$ and serving to eliminate amplitude fluctuations caused by variations of the amplification and changes of the frequency-dependent transmitting characteristics of the circuits. In this case the device D may be a simple potentiometer or equivalent circuit for algebraically combining the voltages $e_3$ and $e_4$.

As shown by a detailed analysis, the limiters $B_1$ and $B_2$, in order to effect compensation of the distortion, should be so designed as to maintain constant amplitudes $E_3$ and $E_4$ of the voltages or signals $e_3$ and $e_4$, respectively, related to one another as follows:

$$E_4/E_3=1+1/n \tag{22}$$

Since the phase changes produced by the network P as well as the phase changes produced by the network Q are not affected by the signal amplitude, the limiters $B_1$ and $B_2$ will have no effect upon the function and operation of the system. With the limiters being designed and adjusted according to the Equation 22, it is found that the output signal or voltage $e_5$ will be proportional to the input voltage $e_1$ or free from the phase distortion produced by the network P. Again, a delay line or equivalent device should be embodied in the distortion-free network R having a time constant equal to the time constant of the network Q.

Figure 10:
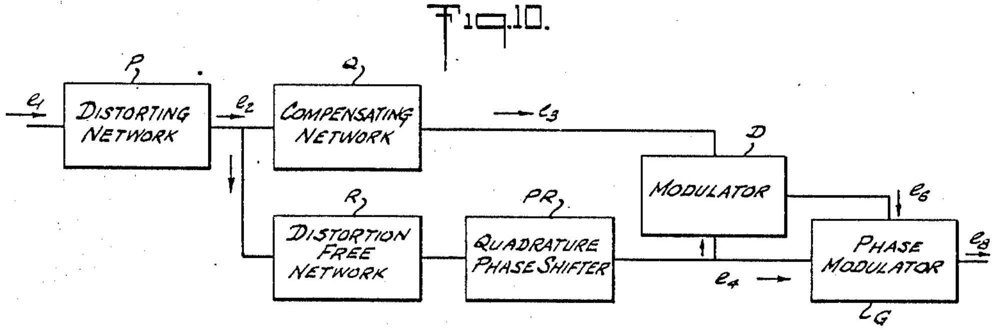

A further modification of a system for compensating distortion without frequency multiplication is shown by Fig. 10. In the latter, the device D takes the form of a modulator similar to Fig. 7 producing a product function output of the input signals or voltages $e_3$ and $e_4$. As is well known, such modulation product contains a steady component $e_6$ varying in proportion to the instantaneous relative phase departure between the voltages $e_3$ and $e_4$ with respect to a 90° phase angle. More specifically, the output voltage $e_6$ obtained by adequate filtering disappears completely if the phase difference between the voltages amounts to 90° and varies proportionately in either direction as the phase angle of one of the voltages deviates in either sense from the 90° phase position, in a manner well known with phase comparator circuits or devices of this type.

Furthermore, the distortion-free network R in Fig. 10 includes a quadrature shifting circuit or device PR which serves to rotate the phase of the signal $e_4$ by 90°. The quadrature output voltage $e_4$ is in turn applied to a phase modulator G being controlled by the output voltage $e_6$ of the phase comparator D, in such a manner as to produce a final output voltage or signal $e_8$ subjected to additional phase variations corresponding to the phase changes produced by the network Q. In other words, the phase comparator D produces an output signal $e_6$ representing the disturbing modulating signal which serves to counter-modulate the distorted signal $e_4$ in the device G, in a manner to substantially cancel the undesired phase distortion.

Figure 11:
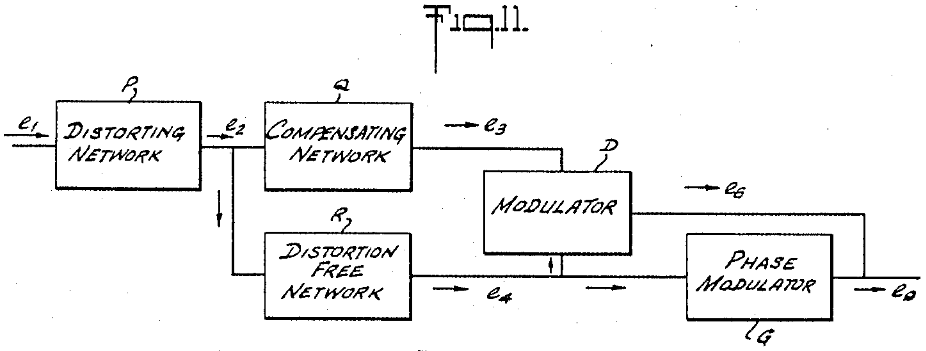

Fig. 11 shows a similar arrangement, wherein the device D may produce a modulation product by a simple difference voltage between the input voltages $e_3$ and $e_4$. G includes a phase modulator whose output voltage varies in accordance with the instantaneous phase deviations of the signal $e_4$. To this output voltage is added the voltage $e_6$ which represents the difference between the voltages $e_4$ and $e_3$, to result in a final compensated output signal $e_9$. Expressed otherwise, the signal $e_6$ is a component representing the total distortion and is added to the voltage $e_4$ in proper phase to cancel the distortion component of the latter to result in a final output signal $e_9$ having the same phase as the input signal $e_1$ and free from the phase distortion produced by the network P.

Figure 12:
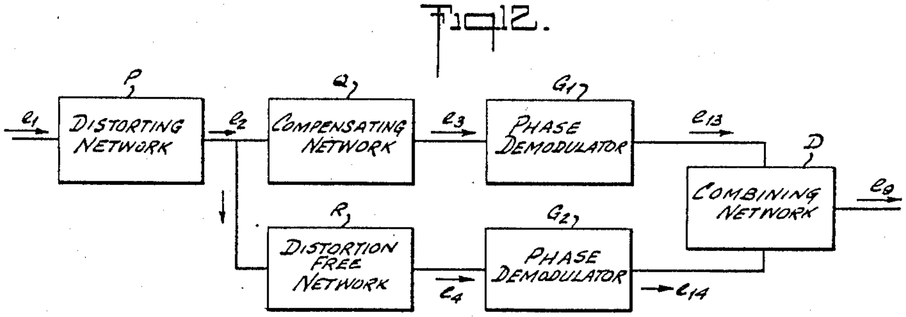

Referring to the modification shown by Fig. 12, the phase modulated oscillations $e_3$ and $e_4$ are demodulated by separate phase detectors $G_1$ and $G_2$, respectively, and the resultant demodulated signals $e_{13}$ and $e_{14}$ are combined in the device D to produce a difference output signal $e_9$ free from distortion. In an arrangement of this type it is also necessary to maintain a constant amplitude relation between the voltages $e_3$ and $e_4$ as described with reference to Fig. 9.

An arrangement of the type according to Fig. 12 may also be used for compensating distortion of amplitude modulated signals. In the latter case the phase modulation detectors $G_1$ and $G_2$ should be replaced by a pair of amplitude modulation detectors or rectifiers.

Figure 13:
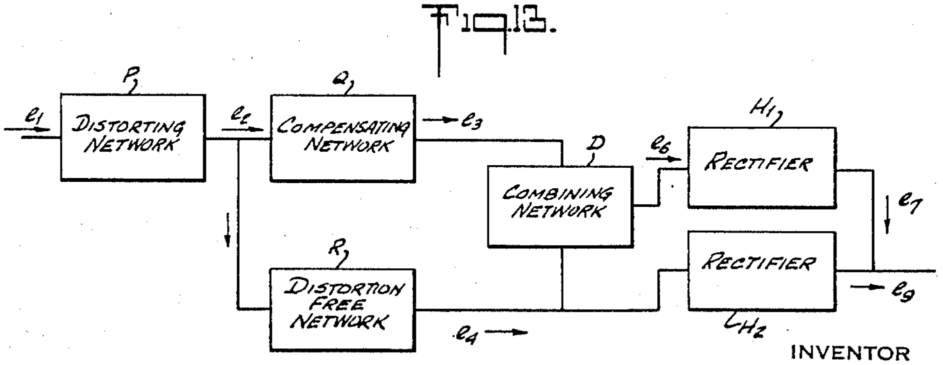

Another similar arrangement for compensating amplitude distortion is shown by Fig. 13, utilizing a pair of rectifiers $H_1$ and $H_2$. The latter serves to rectify the voltage $e_4$ which is free from additional distortion, while the input voltage $e_6$ of the rectifier $H_1$, being equal to the difference between the signals $e_3$ and $e_4$, represents the distortion component which upon rectification is applied to the rectified voltage $e_3$ to result in a final signal $e_9$ in which amplitude distortion is substantially cancelled or neutralized.

Figure 14:
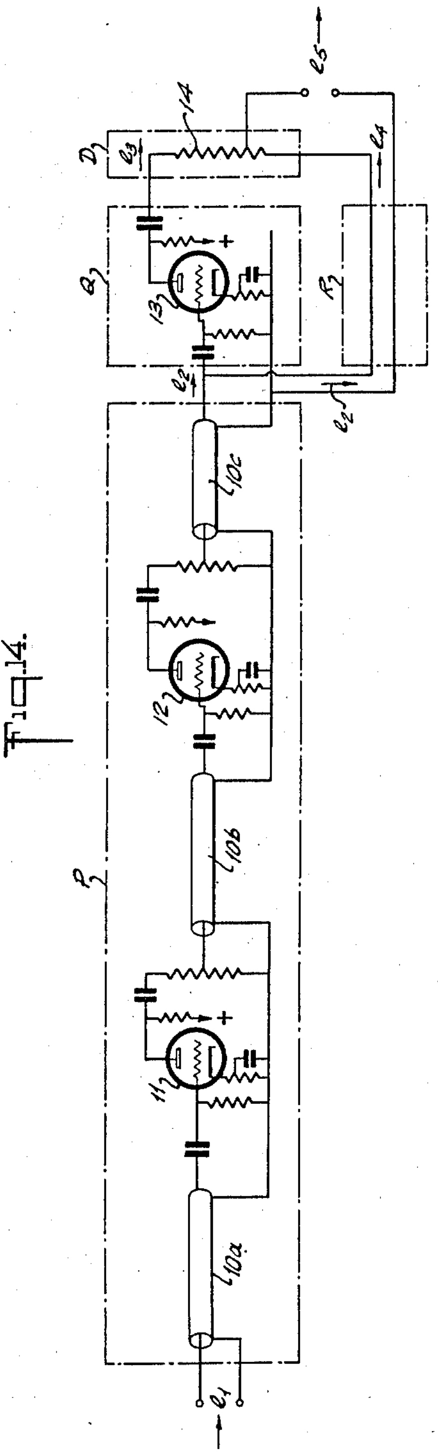
Fig. 14 and Fig. 15 show, by way of example, somewhat more detailed circuit diagrams of an amplitude and phase distortion compensating system of the general type according to Fig. 3 and Fig. 7, respectively.

Fig. 14 shows a more detailed circuit diagram of a transmission system embodying means for compensating amplitude distortion of the general type shown by Fig. 3. The distorting system shown comprises a plurality of concentric cable sections 10*a*, 10*b* and 10*c* interconnected through amplifiers represented by the vacuum tubes 11 and 12 and amplifier circuits of standard construction. Each of the amplifiers introduces a certain amount of amplitude distortion, the total distortion of the system P being equal to the sum of the individual distortions, as is understood. The correcting network Q in this case consists of a single amplifier 13 equal to the amplifiers 11 or 12, to produce additional signal distortion in accordance with the invention. The distortion-free circuit in the example shown is constituted by a simple conducting line, the output voltages of the amplifier 13 and said conducting line being combined in the potentiometer 14 of the device D to result in a compensated output sgnal $e_5$, full compensation being obtained by properly adjusting the tap or connecting point on the potentiometer 14, in a manner readily understood. By thus combining voltages $e_3$ and $e_4$ in a proper amplitude ratio (see Equation 7) by means of the potentiometer, the network R may be a simple circuit or line having a gain 1, as shown.

Figure 15:
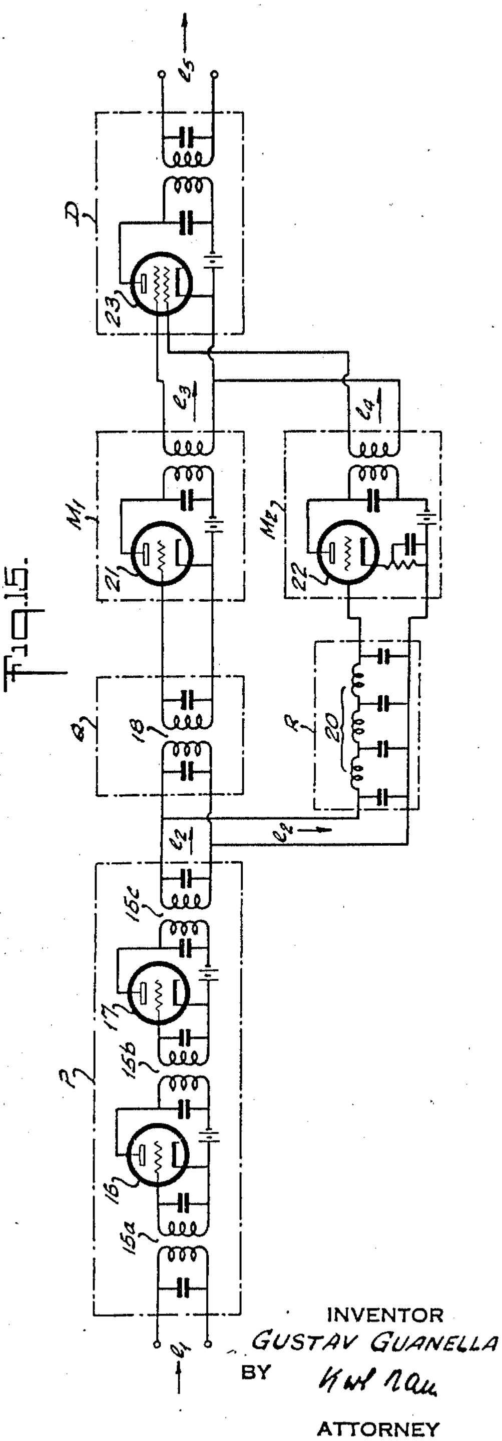

Referring to Fig. 15, there is shown a more detailed circuit diagram of a transmission system including means for compensating phase distortion in accordance with the invention. The distorting network P is shown to comprise a number of amplifiers 16 and 17 coupled in cascade through resonant networks 15*a*, 15*b* and 15*c*, each producing a frequency independent phase shift or distortion in the manner described hereinbefore. Again, the correcting network includes a single filter 18 equal to one of the coupling filters of the network P, while the distortion-free network R is shown in the form of a delay line 20 of known construction. The frequency multipliers $M_1$ and $M_2$ are shown in the form of simple harmonic vacuum tube generators 21 and 22, respectively, while the combining device or modulator D is shown in the form of a double-grid electronic modulator tube 23 producing a final difference frequency output signal $e_5$ free from phase distortion, in a manner explained in greater detail with reference to Fig. 7.

In the foregoing the invention has been described with reference to a few specific illustrative circuits or systems. It will be evident, however, that changes and modifications of the circuits and arrangements shown, as well as the substitution of equivalent circuits and devices for those shown for illustration, may be made without departing from the broader scope of the invention as defined by the appended claims. The specification and drawings are accordingly to be regarded in an illustrative rather than in a limiting sense.

I claim:

1. In a signal transmission circuit comprising a plurality of devices each producing a substantially equal amount of signal distortion with respect to a given signal magnitude, a distortion compensating system comprising means connected to said circuit having a distortion characteristic equal to the characteristic of one of said devices, to produce an additionally distorted first component signal, further distortion-free means for directly deriving a second component signal from said circuit of a value with regard to the distorted magnitude related to the corresponding magnitude of said first component signal by a factor equal to the number of distorting devices in said circuit, and means for differentially combining said first and second component signals in respect to the distorted magnitude, to substantially compensate the distortion in the resultant combined signal.

2. In a signal transmission system comprising a plurality of devices each producing a substantially equal amount of non-linear amplitude distortion, a distortion-compensating system comprising means connected to said circuit having a distortion characteristic equal to the characteristic of one of said devices, to produce an additionally distorted first component signal, further distortion-free means for directly deriving a second component signal from said circuit having an amplitude related to the amplitude of the said first component signal by a factor equal to the number of distorting devices in said circuit, and means for differentially combining said first and second component signals, to substantially compensate distortion in the resultant combined signal.

3. In a signal transmission circuit comprising a plurality of devices each producing a substantially equal amount of non-linear phase distortion, a distortion compensating system comprising means connected to said circuit having a distortion characteristic equal to the characteristic of one of said devices, to produce an additionally distorted first component signal, further distortion-free means for deriving a second component signal from said circuit having a phase related to the phase of said first component signal by a factor equal to the number of distorting devices in said circuit, and means for combining said first and second component signals to produce an output signal having a phase equal to the difference of the phases of said component signals, to substantially compensate the distortion in said output signal.

4. In an arrangement as claimed in claim 3, including means to provide substantially equal frequency-dependent time delays of said first and second means.

5. In a signal transmission circuit comprising a plurality of distorting devices in series having identical non-linear input-output amplitude transmission characteristics, a system for compensating signal distortion comprising a further distorting device identical to said first devices, to produce an additionally distorted signal, means for deriving a further direct signal from said circuit free from additional distortion, and potentiometer means for differentially combining said additionally distorted and said direct signals in proper amplitude relation, to substantially compensate the distortion in the resultant combined signal.

6. In a signal transmission circuit comprising at least one distorting device having a non-linear frequency-phase input-output characteristic, an arrangement for compensating the distortion comprising an auxiliary distorting device similar to said first device, to produce a double-distorted signal derived from said circuit, means for directly deriving a distorted signal from said circuit, further means for frequency multiplying said double-distorted and said direct signals by a factor $m$ and $m+1$, respectively, where $m$ represents the ratio of the phase distortion by said distorting device to the phase distortion by said auxiliary distorting device, and means to mutually intermodulate the frequency multiplied signals, to produce a distortion-free difference frequency output signal.

7. In an arrangement as claimed in claim 6, including means to provide substantially equal transmission time constants for said first and second means.

8. Means for compensating signal distortion due to non-linear input-output relation as to a given signal characteristic of a signal transmission circuit comprising means to subject a distorted signal to additional distortion similar to the distortion caused by said circuit, and means for differentially combining, in respect to said signal characteristic, said additionally distorted signal with said first signal at such relative magnitudes to substantially compensate the distortion in the resultant combined signal.

9. Means for compensating signal distortion due to non-linear input-output relation as to a given signal characteristic of a signal transmission circuit comprising means to subject a signal to additional distortion similar to the distortion caused by said circuit, the distortion by said signal circuit being related to the auxiliary distortion by a constant whole number, including unity, factor, to produce an additionally distorted signal, and means for differentially combining, in respect to said characteristic, said first signal with said additionally distorted signal at magnitudes related by said constant factor, to substantially compensate the distortion in the resultant combined signal.

10. Means for compensating signal distortion due to non-linear input-output amplitude relation of a signal path comprising means to subject a signal to additional distortion similar to the distortion caused by said signal path, the distortion by said signal path being related to the auxiliary distortion by a constant whole number, including unity, factor, to produce an additionally distorted signal, and means for combining said first signal with said additionally distorted signal at amplitudes related by said constant factor, to produce a differential amplitude output signal equal to said first signal and with the distortion thereof being substantially compensated.

11. Means for compensating signal distortion due to non-linear input-output phase relation of a signal path comprising means to subject a signal to additional distortion similar to the distortion caused by said signal path, the distortion by said signal path being related to the auxiliary distortion by a constant whole number, including unity, factor, to produce an additionally distorted signal, and means for combining said first signal with said additionally distorted signal at phases related by said constant factor, to produce a differential phase output signal equal to said first signal and with the distortion thereof being substantially compensated.

12. A method of compensating signal distortion due to non-linear input-output relation as to a given signal characteristic of a signal transmission circuit comprising subjecting an original distorted signal to additional distortion similar to the original distortion by said circuit, to produce an additionally distorted signal, and differentially combining, in respect to said signal characteristic, the additionally distorted signal with the original signal at such relative amplitudes and phase as to substantially compensate the distortion in the resultant combined signal.

13. Means for compensating signal distortion due to non-linear input-output relation as to a given signal characteristic of a signal translation path comprising means to subject a signal from said path to further distortion similar to the original distortion by said path, to produce an additionally distorted signal, means for differentially combining, in respect to said signal characteristic, a signal derived from said path being free from additional distortion with said additionally distorted signal, and means to substantially equalize the transit times and to control the relative magnitudes and phase of said first signal and said additionally distorted signal, respectively, to substantially compensate the distortion of the resultant output signal.

References Cited in the file of this patent

UNITED STATES PATENTS

| | | |
|---|---|---|
| 1,921,022 | Burton | Aug. 8, 1933 |
| 2,109,562 | Bagnall | Mar. 1, 1938 |
| 2,236,134 | Gloess | Mar. 25, 1941 |
| 2,444,063 | Pfleger | June 29, 1948 |
| 2,551,348 | Sunstein | May 1, 1951 |
| 2,632,792 | Selz | Mar. 24, 1953 |